(12) United States Patent
Toneatti et al.

(10) Patent No.: US 7,093,866 B2
(45) Date of Patent: Aug. 22, 2006

(54) BUMPER ASSEMBLY FOR A VEHICLE AND CORRESPONDING VEHICLE COMPRISING SAID BUMPER ASSEMBLY

(75) Inventors: Jean Louis Toneatti, Milan (IT); Mario Vismara, Casatenovo LC (IT)

(73) Assignee: ADLEV S.R.L., Milan (IT)

( * ) Notice: Subject to any disclaimer, the term of this patent is extended or adjusted under 35 U.S.C. 154(b) by 0 days.

(21) Appl. No.: 10/910,790

(22) Filed: Aug. 4, 2004

(65) Prior Publication Data
US 2005/0062300 A1  Mar. 24, 2005

(30) Foreign Application Priority Data
Aug. 6, 2003 (IT) .......................... MI2003A1616

(51) Int. Cl.
*B60R 19/34* (2006.01)
(52) U.S. Cl. ....................................... 293/133; 293/121
(58) Field of Classification Search ................ 293/120, 293/121, 133, 155
See application file for complete search history.

(56) References Cited
U.S. PATENT DOCUMENTS

| | | | |
|---|---|---|---|
| 3,744,835 A | 7/1973 | Carbone et al. | |
| 4,749,613 A * | 6/1988 | Yamada et al. | 442/366 |
| 4,950,031 A * | 8/1990 | Mizunaga et al. | 296/187.11 |
| 5,100,187 A | 3/1992 | Loren | |
| 6,231,094 B1 * | 5/2001 | Uytterhaeghe et al. | 293/122 |
| 6,547,295 B1 * | 4/2003 | Vismara | 293/133 |
| 6,705,653 B1 * | 3/2004 | Gotanda et al. | 293/132 |
| 6,938,936 B1 * | 9/2005 | Mooijman et al. | 293/120 |

FOREIGN PATENT DOCUMENTS

| | | | | |
|---|---|---|---|---|
| FR | 2702432 | * | 9/1994 | 293/120 |
| FR | 2 750 936 A | | 1/1998 | |
| FR | 2 763 546 A | | 11/1998 | |

* cited by examiner

*Primary Examiner*—Dennis H. Pedder
(74) *Attorney, Agent, or Firm*—Nixon & Vanderhye, P.C.

(57) ABSTRACT

A bumper assembly for a vehicle and the corresponding vehicle comprising said bumper assembly are described. The assembly comprises: at least two crash boxes; a cross member made of a first plastic material which, during use, extends over a distance at least corresponding to that between the crash boxes; and at least two substantially indeformable connecting devices connected to said cross member for rigidly fixing said cross member to said chassis of the vehicle, wherein said at least two substantially indeformable connecting devices are connected to the cross member at positions corresponding to the crash boxes. In a preferred embodiment, the crash boxes and the connecting devices are made of plastic material.

18 Claims, 5 Drawing Sheets

BUMPER ASSEMBLY FOR A VEHICLE AND CORRESPONDING VEHICLE COMPRISING SAID BUMPER ASSEMBLY

This application claims priority to IT Application No. MI2003A001616, filed 6 Aug. 2003. The entire contents of this application is incorporated herein by reference.

BACKGROUND AND SUMMARY

The present invention relates to the cushioning of energy generated by bumpers in vehicles and in particular relates to an improved bumper assembly for vehicles as well as a vehicle comprising this bumper assembly and a method for protecting a vehicle from damage caused by impacts.

It is known in the motor car industry to provide bumpers at the front and at the rear of a vehicle in order to cushion the energy resulting from an impact and limit as far as possible any damage to parts of the vehicle and injury to passengers and pedestrians who may be involved in the impact.

At present, in particular, the attention of vehicle manufacturers is directed towards reducing the damage which a vehicle suffers following impacts at relatively low speeds, typically less than about 15–16 km/h. Insurance companies in certain countries, for example Germany and Great Britain, in an attempt to provide increasingly fairer policy premiums, have introduced new evaluation parameters. The current tendency is in fact that of offering a policy premium which is proportional to the so-called "insurance class" of the vehicle and not just the power and the value of the said vehicle. In turn, the insurance class is calculated on the basis of the cost of repair of a vehicle model following impact of both the front and the rear of the vehicle against a rigid carriage at 15–16 km/h.

Car manufacturers, in order to avoid the risk of a reduced market share due to the high operating costs of their vehicles, which are in turn penalized by high insurance premiums, are seeking efficient solutions which will enable them to minimize the damage to their vehicles following impacts at low speeds, typically less than about 15–16 km/h.

At present, car manufacturers provide a so-called "sacrificial element" (otherwise known as "crash box") which, in the event of impact, cushions most of the impact energy, being deformed but preventing deformation of the vehicle chassis. In fact, any deformation of the chassis would result in decidedly high repair costs and unacceptably high insurance costs as a result.

Typically, a bumper assembly with a sacrificial element of the known type comprises a pair of crash boxes, a cross member, a cushioning element (for example made of foam or the like) and a bumper shield. In the bumper assembly of the abovementioned known type, the two crash boxes are fixed to the ends of two respective longitudinal members of the vehicle chassis by means of two respective plates. The cross member is joined to the opposite side of the crash boxes and extends continuously from one crash box to the other. The cushioning element made of foam or the like, when envisaged, is constrained to the outside of the cross member. The bumper assembly is moreover completed by a bumper shield having primarily aesthetic and aerodynamic functions. The cushioning element, for example made of expanded polypropylene or the like, is characterized by a marked capacity to return resiliently into the initial non-deformed position at the end of an impact acting on it at very low speeds (speeds less than 4–5 km/h) and occurring for example during parking manoeuvres.

Conventionally, both the crash boxes and the cross member are made of metallic materials, typically sheet steel or aluminium. Generally, the presence of a cross member allows the impact pressure to be spread in a more uniform and equally distributed manner. In terms of order of magnitude, the force acting on the crash boxes relative to the surface area of the crash boxes (with no cross member) is equal to about 20 N/mm$^2$, but decreases to about 3–5 N/mm$^2$ when the cross member is present, owing to the improved impact surface area. Such a pressure is compatible with the rigidity (1–6 N/mm$^2$) of a deformable NCAP barrier ("impactor") used for simulation of a real impact. Therefore, the need to provide a cross member between two crash boxes is determined firstly by the fact that, in the case of real impacts involving two cars, the cross member of the striking vehicle simulates the rigid impact of a so-called "insurance test".

Moreover, the cross member ensures an improved distribution of the impact, even if offset. In fact, usually the barrier (or impactor) used to carry out the insurance impact tests covers 40% of the vehicle. For this reason, on account of the geometry of the bumpers, an offset impact does not occur against the boxes, but the first contact during impact occurs at about 2–3 cm from the latter.

Finally, in the case of an impact with a pole in a substantially central zone, the cross member allows the force to be distributed over the two lateral crash boxes for improved protection of the vehicle.

In the known solution described above, the cross member is fixed to the distal end of the crash boxes by means of a conventional mechanical fixing system, for example by means of welding, screws and bolts or the like. For the purpose of the present patent application, the adjectives "distal" (or "external") and "proximal" (or "internal") must be understood with reference to a vehicle (not shown in its entirety). In other words, the "distal" side is the side furthest from the vehicle, while the "proximal" side is the side closest to the said vehicle.

The known solutions described above (metal crash boxes, plates for fixing the crash boxes to the longitudinal members and metal cross members fixed to the distal ends of the crash boxes) are satisfactory from the point of view of the impact resistance, but are considered to be somewhat awkward to assemble, heavy, costly and not easily adaptable to new vehicle models.

Bumper assemblies comprising only plastic crash boxes (which perform essentially the same functions as metal crash boxes) are also known. These bumper assemblies do not have a continuous cross member, but nevertheless are able to pass the insurance impact tests carried out in laboratories. These bumper assemblies work reasonably well for impacts against fixed obstacles and may be made precisely of plastic materials, in a low-cost manner and with fairly low weights, for example by means of a plastic honeycomb structure.

However, a drawback of these bumper assemblies without cross member is the inability to withstand adequately concentrated central impacts, of the type known as "pole impact".

Finally, in an attempt to solve the drawbacks of bumper assemblies without a cross member, compromise solutions of associating a sheet metal cross member with the known plastic crash boxes have been proposed. In the case of these bumper assemblies also, the sheet metal cross member is constrained to the distal end of the plastic crash box. These bumper assemblies offer a greater resistance to the concentrated central impacts than the solutions without cross member. The drawback in this case consists in the difficulty of constraining in an effective, lasting and reliable manner a fairly heavy metal body (cross member) to a plastic body (crash box, in turn fixed to the longitudinal member).

For example, according to a first known embodiment, the metal cross member was constrained to each of the plastic crash boxes by means of a through-screw system, but this had the negative result of a different deformational behaviour of the crash boxes. Basically, the through-screws, in the event of impact, tend to cut the crash boxes through.

According to a second known embodiment, the metal cross member was constrained to each of the plastic crash boxes by means of elongated projections which engage with corresponding through-holes in the cross member. The ends of the elongated projections which protrude from the holes of the cross members are then hot-riveted in order to achieve fixing between the crash box and cross member. However, this second known embodiment does not provide guarantees as to the reliability and duration over time of the crash box/cross member constraining system because of the weight of the cross member itself, the mechanical stresses and the fixing areas which are relatively small.

From FR 2 763 546 a bumper assembly for a vehicle is known. The bumper assembly according to FR 2 763 546 comprises a bumper shield 2, a cross member 3 and two local bumpers 4 to be fixed to a vehicle chassis 5. Each of the local bumpers 4 comprises an absorber element 6 and two "U" shaped plates 7. The plates 7 and element 6 form an elastic assembly arranged between the vehicle chassis and the cross member. The length of the "U" shaped plates is equal to the one of the absorber element. Thus, the cross member 3 is not fixed to the vehicle chassis in a rigid manner. Furthermore, such cross member is fixed to the chassis by metal plates, screws and bolts.

From U.S. Pat. No. 3,744,835 a shock absorbing honeycomb bumper is known. The bumper according to U.S. Pat. No. 3,744 835 is constructed from plastic, metallic or paper honeycomb material and covered by a rubber, metal or plastic shell. The bumper is shock absorbent to reduce damage to the fenders and body of the automotive during slow speed crashes. The bumper is attached to the vehicle by a pair of T-bolts which are fastened by nuts on fender. Thus, the bumper is not attached directly to the vehicle chassis and it does not provides for a rigid connection between a cross member and the vehicle chassis.

In the light of these not entirely satisfactory results of the known bumper assemblies, the Applicant has attempted to find a solution able to provide a bumper assembly which would be effective in all impact conditions, practical in terms of assembly, substantially modular so as to be easily adapted to new vehicle models, as well as having a long duration over time and being low-cost.

In a first attempt to achieve the abovementioned objects, the Applicant simply replaced the sheet metal cross member with a cross member made of plastic material, while maintaining a similar system for fixing together the plastic crash box and cross member so as to form essentially a beam (cross member) system resting on two points (plastic crash boxes). According to a first attempt, the plates were simply used to constrain the crash boxes to the longitudinal members.

The Applicant however ascertained that, owing to the well-known low Young's modulus and yield point values of plastic materials (about 2,000 N/mm$^2$ for non-reinforced plastics or in any case $\leq$10,000 N/mm$^2$ for plastics reinforced with glass fibres compared to 210,000 N/mm$^2$ for steel), with relatively small forces there is an excessive deformation in the cross member and therefore little energy cushioning. This behaviour does not guarantee protection of a vehicle in the event of an impact.

In order to improve these poor values for the Young's modulus and yield point, the Applicant used for the cross member a plastic material reinforced with short or long glass fibres. The Applicant established, however, that this increase in the Young's modulus and yield point values is accompanied in an undesirable manner by an increased fragility. For this reason, an impact force close to the maximum admissible value results in breakage of the cross member and therefore the situation where the two crash boxes are no longer connected to each other (reproducing a situation similar to the solution without cross member).

The Applicant obtained the same unsatisfactory results also when the cross member (made of non-reinforced or reinforced plastic material) is constrained to the bumper shield.

The Applicant realised that optimum results could be obtained using a different type of system for constraining cross member and crash boxes (absorbers), replacing a configuration of the type where the beam rests on two points with a configuration of the type where the beam is joined in an interfitting manner at two points.

In other words, the idea forming the basis of the present invention is that of constraining a plastic cross member, by means of a substantially rigid interfitting joint, to the chassis (typically to the two longitudinal members) of the vehicle, inserting the crash boxes inside it.

According to a first aspect, the present invention relates to a bumper assembly for a vehicle comprising a chassis. The bumper assembly comprises: at least two crash boxes; a cross member made of a first plastic material which, during use, extends over a distance at least corresponding to that between the crash boxes; and at least two substantially indeformable connecting devices connected to the cross member for rigidly fixing said cross member to the chassis of the vehicle, wherein the substantially indeformable connecting devices are connected to the cross member at positions corresponding to the crash boxes.

Typically, the substantially indeformable connecting devices are made of a second plastic material.

Profitably, the first plastic material is the same plastic material as the second plastic material.

Preferably, the substantially indeformable connecting devices are directly connected to the cross member by a welding process, more preferably by an hot blade welding process.

Preferably, both the first and second plastic materials comprise XENOY®.

According to a preferred embodiment, the at least two substantially indeformable connecting devices are substantially solid. Alternatively, the at least two substantially indeformable connecting devices have a honeycomb cross-section.

Advantageously, the cross member comprises at least one first connecting surface and each of said substantially indeformable connecting devices comprises at least one corresponding second surface for surface connecting said cross member to said substantially indeformable connecting devices along said surfaces.

Preferably, the cross member has a cross-section which is substantially at least partially open in the form of an "Ω" or "H".

Advantageously, each of said substantially indeformable connecting devices comprises a fixing device for fixing said substantially indeformable connecting device to a respective crash box.

According to a preferred embodiment, each of the crash boxes is integral with a respective substantially indeformable connecting device. Alternatively, the crash boxes are integral with said cross member.

The bumper according to the present invention could further comprise one or more of: a reinforcing element, an impact cushioning element, a bumper shield.

According to a second aspect, the present invention provides a method for protecting a vehicle from damage caused by impacts, said vehicle comprising a chassis, the method comprising the steps of: providing at least two crash boxes; providing a cross member made of a first plastic material which extends over a distance at least corresponding to that between the crash boxes; and directly connecting to said cross member at least two substantially indeformable connecting devices for rigidly fixing said cross member to said chassis of the vehicle, wherein said at least two substantially indeformable connecting devices are connected to the cross member at positions corresponding to the crash boxes.

According to a third aspect, the present invention provides a vehicle with a chassis and comprising a bumper assembly which comprises: at least two crash boxes; a cross member made of a first plastic material which, during use, extends over a distance at least corresponding to that between the crash boxes; and at least two substantially indeformable connecting devices connected to the cross member for rigidly fixing said cross member to the chassis of the vehicle, wherein the substantially indeformable connecting devices are connected to the cross member at positions corresponding to the crash boxes.

BRIEF DESCRIPTION OF THE DRAWINGS

There now follows a detailed description of preferred embodiments of the present invention, to be read with reference to the accompanying illustrative plates, in which.

DETAILED DESCRIPTION

Figure 1:
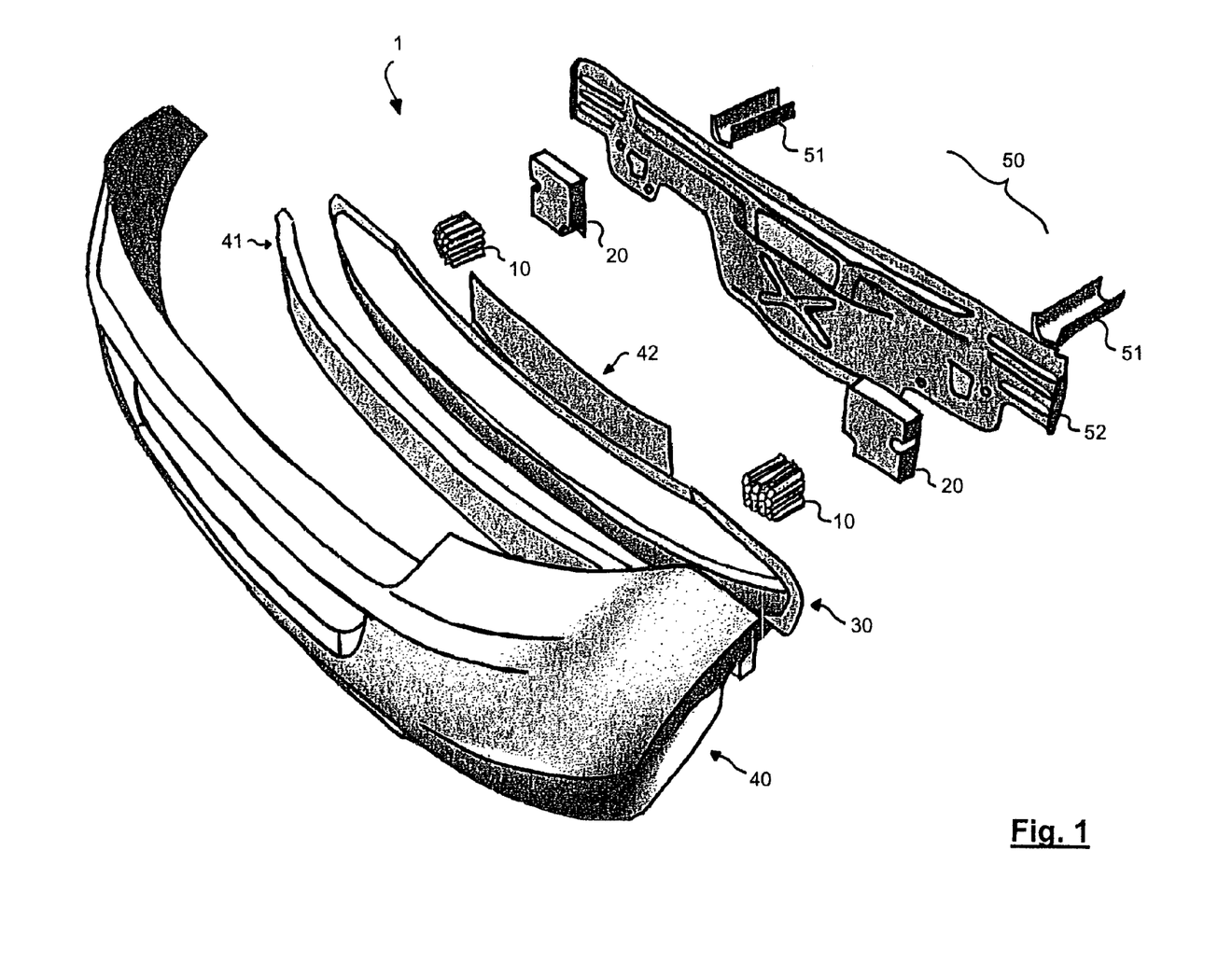
FIG. 1 shows an exploded view of the bumper assembly according to the present invention.
Figure 2:
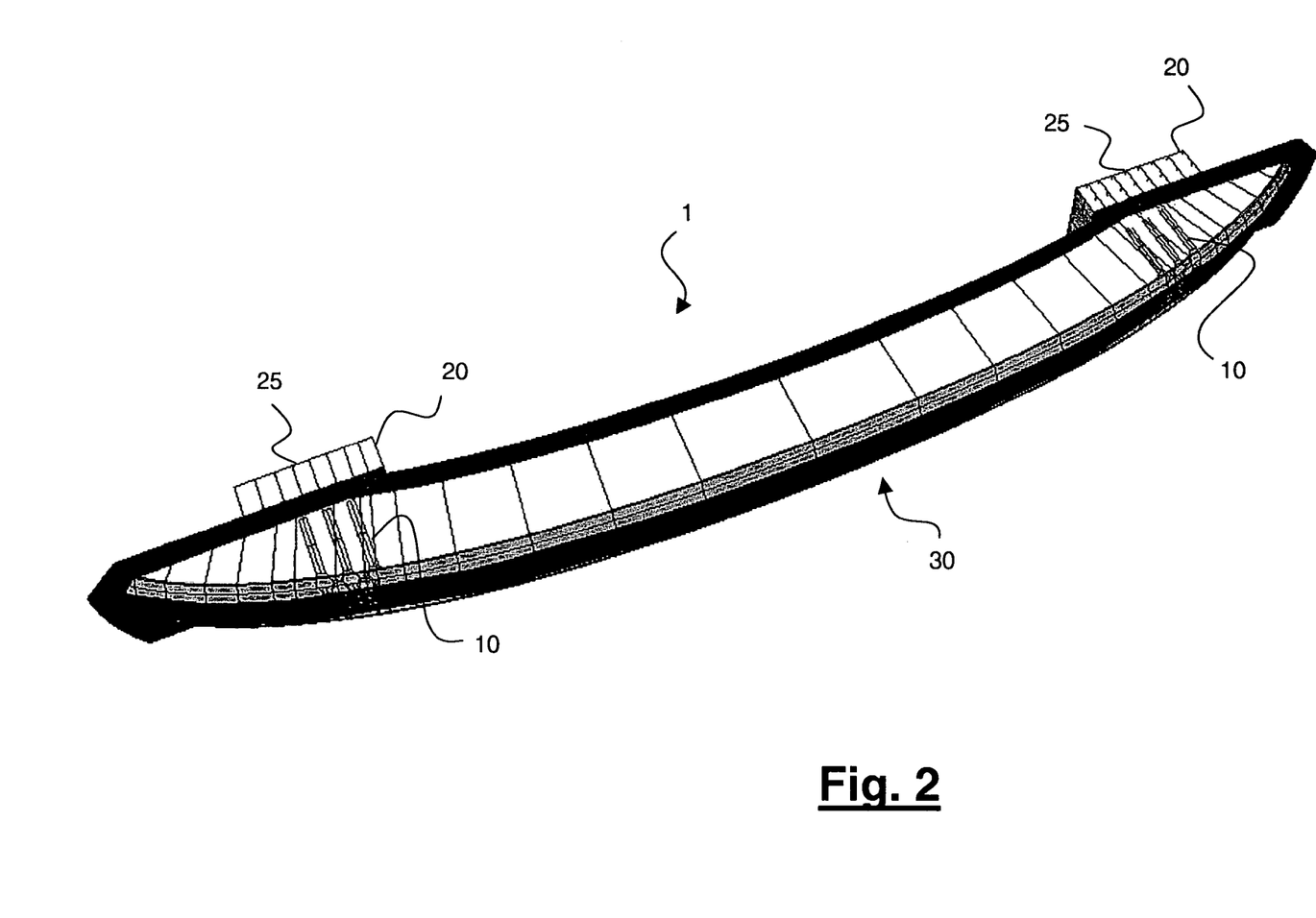
FIG. 2 shows a perspective view of the bumper assembly in the assembled condition.

With reference to FIG. 1 and FIG. 2, the bumper assembly 1 according to the present invention comprises at least two crash boxes 10, at least two respective substantially indeformable connecting devices 20 for rigidly fixing said cross member to said chassis of the vehicle and a cross member 30. Profitably, the substantially indeformable connecting devices 20 are in the form of connecting plates 20. Conveniently, the bumper assembly 1 also comprises a bumper shield 40 which is suitably shaped.

Preferably, the bumper assembly 1 according to the invention also comprises an impact cushioning element 41 applied distally to the cross member 30.

Preferably, the bumper assembly 1 according to the invention also comprises a reinforcing element 42 applied proximally or distally to the cross member 30.

According to the present invention, the cross member 30 and, at least partially, the connecting plates 20, are made of a plastic material or the like. For the purpose of the present patent application, the term "plastic material" is intended to mean primarily a material different from metal and in particular a substantially thermoplastic material with elongation at break values $\geq 50\%$ (for tensile tests on test pieces at 5 mm/min.) such as polycarbonate, polyester, polybutylene terephthalate, polypropylene, polyamide and derivatives thereof, EPDM reinforced polypropylene or the like and any combination thereof. The Applicant has ascertained in particular that a material particularly suitable for manufacture of the present invention is XENOY® PC/PBT marketed by GE Plastics. The resin XENOY® is already used in the motor car sector and ensures optimum resistance to motor fuels as well as a high level of resistance to impacts also at low temperatures and strength over time. For the purpose of the present patent application, the term "substantially indeformable" used in connection with "connecting devices" is intended to mean connecting devices which do not result in a visible deformation when they are subject to pressures of the order of at least 20 N/mm$^2$.

In order to increase the Young's modulus and yield point values of the plastic materials used, the present invention envisages optionally reinforcing the plastic materials with long or short glass fibres.

Figure 3:
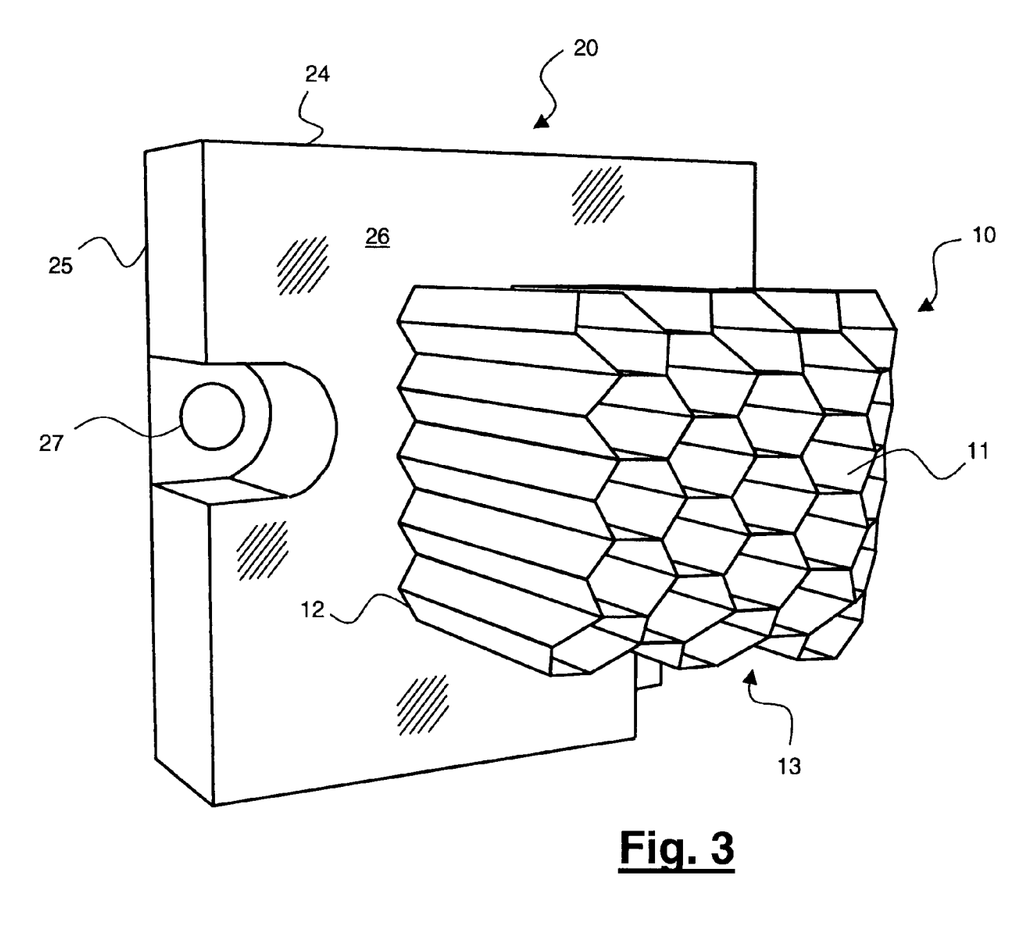
FIG. 3 shows an embodiment of a crash box integrally constrained to a connecting plate.
Figure 4A:
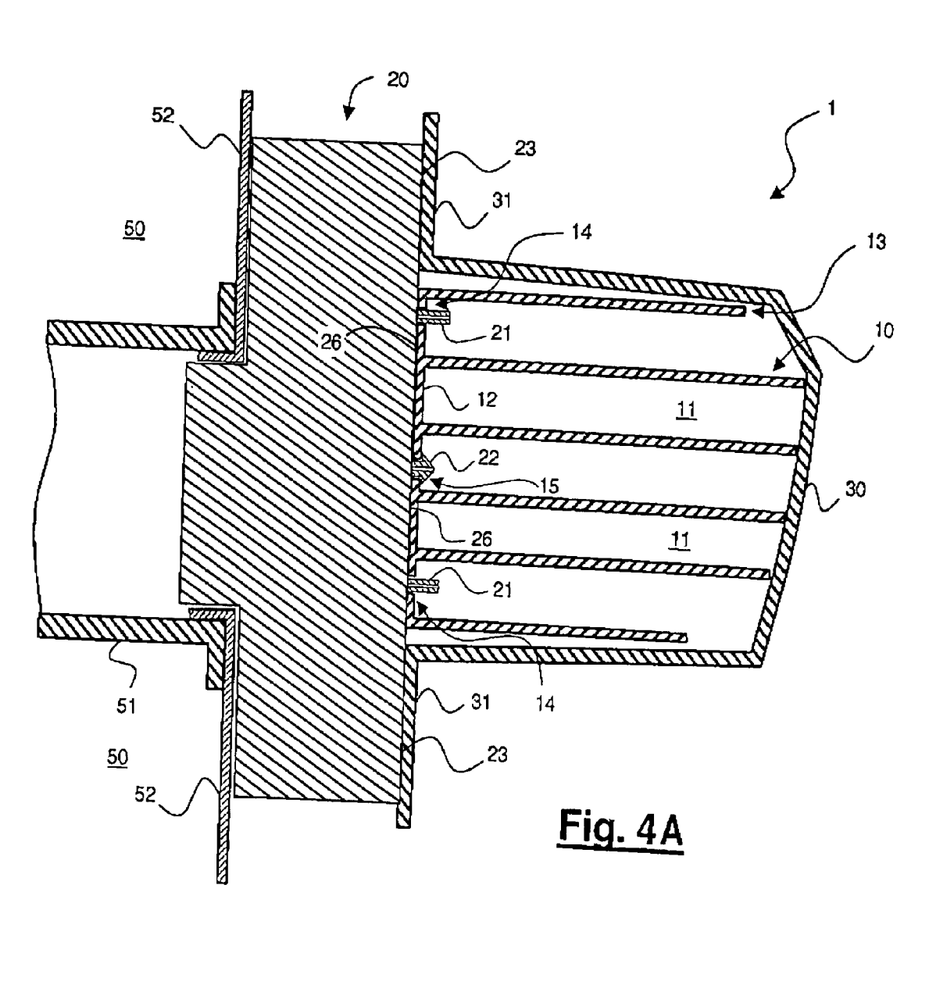
FIG. 4A shows a cross-section through a bumper assembly assembled with a vehicle chassis according to a first example implementation.
Figure 4B:
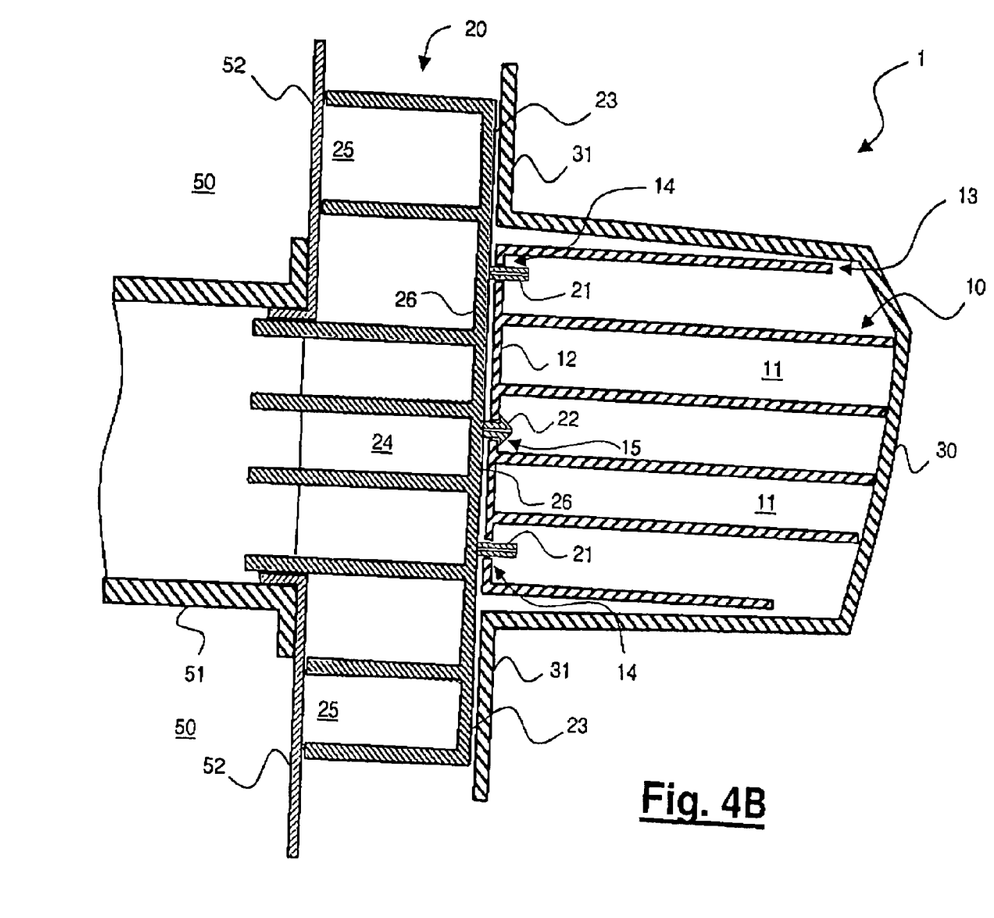
FIG. 4B shows a cross-section through a bumper assembly assembled with a vehicle chassis according to a second example implementation.

According to one embodiment of the invention (FIG. 3), each of the crash boxes 10 essentially comprises a plurality of elongated elements 11 with a hexagonal cross-section, joined together so as to form a body of the parallelepiped type, the cross-section of which substantially corresponds to the combination of the plurality of hexagonal cross-sections. In one embodiment of the invention, shown in FIGS. 3 and 4, there are twenty three elongated elements 11 with a hexagonal cross-section, arranged in a "5-4-5-4-5" configuration, but it will be understood that other configurations (for example "3-2-3-2" are nevertheless considered suitable, depending on the applications). Generally, the number of cells is variable depending on the collapse force. The Applicant has ascertained that, in order to obtain a greater strength, it is preferable to increase the number of cells instead of increasing their wall thickness. Preferably, the diameter of the circumference circumscribed around the hexagonal elements 11 is $\geq$ about 10 mm, more preferably $\geq$ about 15 mm and the thickness of each cell is $\geq$ about 0.5 mm, more preferably $\geq$ about 1.0 mm. Preferably, each of the crash boxes 10 is obtained by means of injection moulding of a plastic material with internal rake values $\leq 0.5°$.

In the embodiment shown (see cross-section in FIG. 4), one side 12 of the crash box 10 is substantially flat, while the opposite side 13 is formed in a tapered manner so as to have an initial collapse surface designed to reduce the initial collapse peak. The flat side 12 is also defined as a proximal side because, when the crash box is mounted on the chassis 50 (longitudinal member 51 of the vehicle and/or dorsal member 52), it is closest thereto; similarly, the tapered side 13 is referred to as the distal side.

The proximal side 12 of the crash box is substantially closed, but has a plurality of holes 14, 15 with a preferably circular cross-section which may be divided up into holes 14 for locating/centring pins and holes 15 for pressure fixing pins, which will be described below with reference to the connecting plates 20. Last but not least, the holes 14, 15 have the function of ensuring that the wall thicknesses are properly maintained during moulding of the part.

At the distal side 13 of the crash box there is preferably a fastening system, preferably a system of projecting teeth, for example four projecting teeth arranged on opposite sides of the hexagonal elements (not shown).

According to a preferred embodiment (FIG. 3), the crash box 10 and the respective connecting plate 20 are formed as one piece or are joined together by means of hot blade welding or a similar joining process.

It will nevertheless be understood that the crash box 10 may also be made of a metallic material, not necessarily a plastic material and may have a form which is different from that described and shown.

According to a further embodiment of the invention (not shown), the crash boxes 10 and the cross member 30 are formed as one piece or are joined together by means of hot blade welding or a similar joining process.

The cross member 30, which is made of a plastic material, as mentioned above, is formed longitudinally in any manner depending on the requirements and the space available in the vehicle on which it will be installed. As regards its cross-section, it may be equally well box-shaped or open, for example substantially in the form of an "Ω" (omega), as clearly shown in FIG. 4, or in the form of an "H". The cross member 30 has preferably a thickness of between about 2 and 8 mm, preferably between about 3 and 6 mm and even more preferably about 4 mm. In order to increase the rigidity of the cross member 30, internal baffles which are suitably spaced from each other may be envisaged.

In the preferred embodiment, the cross member 30 has an omega-shaped cross-section so that the flat flanges 31 which extend in opposite directions form a first connecting surface which can be joined to a second corresponding connecting surface 23 provided directly on the chassis 50 (or better, on the longitudinal member and/or on the dorsal member) or, preferably, on the substantially indeformable connecting devices (connecting plates) 20 which will be described hereinbelow.

The connecting plates 20 comprise a body 24 which is sold in cross-section (as shown in FIG. 4A) or has a honeycomb cross-section (as shown in FIG. 4B) and is substantially rigid with a first proximal side 25 facing directly the end of the longitudinal member 51 of the vehicle chassis and a distal side 26 co-operating with the proximal side 12 of the crash box 10. Depending on the geometry of the longitudinal member 51, the vehicle and the bumper assembly, the two sides 25,26 may not be parallel. From the distal side 26 of the connecting plate 20, in the embodiment shown in FIG. 4, there extend locating/centring pins 21 and pressure fixing pins 22 able to engage with the respective holes 14,15 in the proximal side 12 of the crash box 10. The connecting plates 20 are constrained integrally to the ends of the longitudinal members 51 and/or to the dorsal members 52 by means of any mechanical constraining device, for example by means of screws and bolts. Preferably, the connecting plates have a thickness of between about 10 mm and 100 mm, more preferably between 15 mm and 50 mm.

Each connecting plate 20 comprises at least one second connecting surface 23 co-operating with the first connecting surface 31 on the cross member 30. Preferably two second opposite connecting surfaces 31 are provided. The area of each of the second surfaces is preferably between about 1000 $mm^2$ and 5000 $mm^2$, more preferably between about 1100 $mm^2$ and 2500 $mm^2$.

Conveniently, the cross member 30 and connecting plates 20 are made of the same material or a compatible material which allows them to be joined together in a simple, low-cost and reliable manner. Preferably, the cross member and fixing plate are made of a plastic material, in particular XENOY®. Preferably, the cross member and the fixing plates 20 are joined together by means of welding, more preferably by means of hot blade welding.

Since the connecting plates 20 are substantially rigid and indeformable, the cross member 30 is constrained directly to the chassis 50 of the vehicle, for example by means of the longitudinal members 51 and/or the dorsal members 52 and provides a better impact resistance than the existing solutions.

Conveniently, as mentioned above, the cross member 30 has a cross-section which is substantially in the form of an "Ω" (omega) and the crash boxes 10 are housed inside the cross member 30, i.e. inside its hollow part (FIG. 4). The crash boxes may be made of metal or plastic, this latter solution being preferred. The crash boxes 10 could be constrained to the cross member 30 by means of interfitting engagement, pressure or in any other manner. Optionally they could also be simply centered. In a solution which is even more preferred, the crash boxes 10 are integral with the cross member 30 and are obtained by moulding the latter or joined by means of hot blade welding.

In order to improve the strength of the cross member 30, depending on the circumstances, a reinforcing element 42 may be conveniently envisaged, being connected to the cross member 30, preferably in a proximal manner. The reinforcing element 42 is preferably made of plastic or metal (for example steel) and may be connected to the cross member 30 by means of a mechanical connecting system of the screw and bolt type, welding or bonding.

Finally, conveniently, the bumper assembly 1 comprises an impact cushioning element 41 which is applied distally to the cross member, this element comprising a material such as foam, for example expanded polypropylene, expanded polyurethane, expanded polystyrene and derivatives thereof. Alternatively, the cushioning element comprises a honeycomb thermoplastic absorber.

In a particular embodiment, each connecting plate 20 comprises a hook, for example a hook for towing the vehicle. In the case of plastic connecting plates, these metal hooks connected to metal plates provided with holes opposite the fixing holes 27 of the plate 20 may be embedded in plastic material during production of the said plates by means of injection moulding.

Thus, at least two substantially indeformable connecting devices 20 (possibly plate shaped) for rigidly fixing the cross member 30 to the chassis (50, 51, 52) of the vehicle are provided. The at least two substantially indeformable connecting devices 20 are directly between the chassis and the cross member 30. The cross member 30 is in contact with the connecting devices 20 through surfaces 23 and 31 (see FIG. 4); in turn, the substantially indeformable connecting devices 20 are in contact with the vehicle chassis 50, 51, 52. In case of crash, the cross member 30 and crash boxes 10 absorb the impact energy for which they are designed. Only after that cross member and crash boxes have become deformed, the connecting devices 20 will start to become deformed. During such a crash and before any deformation of the connecting device has become, the relative position of the contact surface (23, 31) between the connecting devices 20 and the cross member is unchanged with respect to at least one of the contact surfaces between the connecting devices 20 and the vehicle chassis (50, 51, 52).

It is obvious that the embodiments of the bumper assembly may be subject to numerous modifications, adaptations, variations and replacement of parts with others which are functionally equivalent, but that these modifications, adaptations, variations and replacement of parts are to be understood as being within the scope of the present invention which is limited solely by the following claims.

The invention claimed is:

1. A bumper assembly for a vehicle, the vehicle comprising a chassis, the bumper assembly comprising:
   a first crash box and a second crash box;
   a cross member comprised of a first thermoplastic material which, during use, extends over a distance at least corresponding to that between the crash boxes; and
   a first and second substantially indeformable connecting devices contacting said cross member for rigidly fixing said cross member to said chassis of the vehicle;
   wherein said first and second substantially indeformable connecting devices do not result in a visible deformation when they are subject to pressures of the order of at least 20 N/mm$^2$;
   wherein said first and second substantially indeformable connecting devices are connected to the cross member at positions corresponding to said first and second crash boxes;
   wherein said first substantially indeformable connecting device is in contact with said first crash box; and
   wherein said second substantially indeformable connecting device is in contact with said second crash box.

2. A bumper assembly according to claim 1, wherein said first and second substantially indeformable connecting devices are made of a second thermoplastic material.

3. A bumper assembly according to claim 2, wherein said first thermoplastic material is the same thermoplastic material as the second thermoplastic material.

4. A bumper assembly according to claim 1, wherein said first and second substantially indeformable connecting devices are directly connected to said cross member by a welding process, preferably by a hot blade welding process.

5. A bumper assembly according to claim 2, wherein said first and second thermoplastic materials comprise XENOY®.

6. A bumper assembly according to claim 1, wherein said first and second substantially indeformable connecting devices are substantially solid.

7. A bumper assembly according to claim 1, wherein said first and second substantially indeformable connecting devices have a honeycomb cross-section.

8. A bumper assembly according to claim 1, wherein said cross member comprises at least one first connecting surface and each of said first and second substantially indeformable connecting devices comprises at least one corresponding second surface for surface connecting said cross member to said first and second substantially indeformable connecting devices along said surfaces.

9. A bumper assembly according to claim 2, wherein said cross member has a cross-section which is substantially at least partially open in the form of an "Ω" or "H".

10. A bumper assembly according to claim 1, wherein said first crash box is integral with said first substantially indeformable connecting device and said second crash box is integral with said second substantially indeformable connecting device.

11. A bumper assembly according to claim 1, wherein said first and second crash boxes are integral with said cross member.

12. A bumper assembly according to claim 1, further comprising a reinforcing element.

13. A bumper assembly according to claim 1, further comprising an impact cushioning element.

14. A bumper assembly according to claim 1, further comprising a bumper shield.

15. A method for protecting a vehicle from damage caused by impacts, said vehicle comprising a chassis, the method comprising:
   providing a first crash box and a second crash box;
   providing a cross member comprised of a first thermoplastic material which extends over a distance at least corresponding to that between the crash boxes; and
   connecting to said cross member a first and second substantially indeformable connecting devices for rigidly fixing said cross member to said chassis of the vehicle;
   wherein said first and second substantially indeformable connecting devices do not result in a visible deformation when they are subject to pressures of the order of at least 20 N/mm$^2$;
   wherein said first and second substantially indeformable connecting devices contact the cross member at positions corresponding to said crash boxes;
   wherein said first substantially indeformable connecting device is in contact with said first crash box; and
   wherein said second substantially indeformable connecting device is in contact with said second crash box.

16. A vehicle comprising a bumper assembly, the bumper assembly comprising:
   a first crash box and a second crash box;
   a cross member comprised of a first thermoplastic material which, during use, extends over a distance at least corresponding to that between said first and second crash boxes; and
   a first and a second substantially indeformable connecting devices connected to said cross member rigidly connecting said cross member to said chassis of the vehicle;
   wherein said first and second substantially indeformable connecting devices do not result in a visible deformation when they are subject to pressures of the order of at least 20 N/mm$^2$;
   wherein said first and second substantially indeformable connecting devices contact said cross member at positions corresponding to said first and second crash boxes;
   wherein said first substantially indeformable connecting device is in contact with said first crash box; and
   wherein said second substantially indeformable connecting device is in contact with said second crash box.

17. A bumper assembly according to claim 1, wherein each of said crash boxes comprises first holes, wherein each of said substantially indeformable connecting devices comprises pressure fixing pins and wherein said pressure fixing pins engage with said first holes for connecting together each of said crash boxes with one respective substantially indeformable connecting device.

18. A bumper assembly according to claim 1, wherein each of said crash boxes comprises second holes, wherein each of said substantially indeformable connecting devices comprises centering pins and wherein said centering pins engage with said second holes.

* * * * *